(12) United States Patent
Lee

(10) Patent No.: US 11,913,806 B2
(45) Date of Patent: Feb. 27, 2024

(54) GEOSPATIAL MAPPING

(71) Applicant: Vizzio Technologies Pte Ltd, Singapore (SG)

(72) Inventor: Seng Fook Lee, Singapore (SG)

(73) Assignee: Meridian Innovation Pte Ltd, Singapore (SG)

( * ) Notice: Subject to any disclaimer, the term of this patent is extended or adjusted under 35 U.S.C. 154(b) by 165 days.

(21) Appl. No.: 17/577,369

(22) Filed: Jan. 17, 2022

(65) Prior Publication Data

US 2022/0228885 A1 Jul. 21, 2022

Related U.S. Application Data

(63) Continuation-in-part of application No. 17/521,874, filed on Nov. 9, 2021.

(60) Provisional application No. 63/137,752, filed on Jan. 15, 2021, provisional application No. 63/137,751, filed on Jan. 15, 2021, provisional application No. 63/137,746, filed on Jan. 15, 2021, provisional application No. 63/137,748, filed on Jan. 15, 2021, provisional application No. 63/137,749, filed on Jan. 15, 2021, provisional application No. 63/137,743, filed on Jan. 15, 2021, provisional application No. 63/137,745, filed on Jan. 15, 2021.

(51) Int. Cl.
| | |
|---|---|
| *G06T 17/05* | (2011.01) |
| *G06T 15/04* | (2011.01) |
| *G01C 21/00* | (2006.01) |
| *G06V 10/25* | (2022.01) |
| *G06V 20/13* | (2022.01) |
| *G06V 20/10* | (2022.01) |

(52) U.S. Cl.
CPC ..... *G01C 21/3852* (2020.08); *G01C 21/3815* (2020.08); *G06T 15/04* (2013.01); *G06T 17/05* (2013.01); *G06V 10/25* (2022.01); *G06V 20/13* (2022.01); *G06V 20/176* (2022.01)

(58) Field of Classification Search
None
See application file for complete search history.

(56) References Cited

U.S. PATENT DOCUMENTS

| | | | |
|---|---|---|---|
| 9,064,337 B2* | 6/2015 | Pahwa | G06T 15/04 |
| 2021/0019937 A1* | 1/2021 | Gallaway | G06T 15/20 |
| 2021/0199433 A1* | 7/2021 | Chiba | G06T 1/00 |
| 2021/0201570 A1* | 7/2021 | Yu | G06T 17/05 |

OTHER PUBLICATIONS

Hayder Dibs et al, "Extracting Detailed Buildings 3D Model With Using High Resolution Satellite Imagery by Remote Sensing and Gis Analysis; Al-Qasim Green University A Case Study", International Journal of Civil Engineering and Technology (IJCIET), vol. 9, Issue 7, Jul. 2018, pp. 1097-1108 (Year: 2018).*

* cited by examiner

*Primary Examiner* — Tize Ma
(74) *Attorney, Agent, or Firm* — HORIZON IP PTE LTD

(57) ABSTRACT

Efficient 3D geospatial mapping is disclosed. A 3D geospatial map of an area of interest is generated from 2D satellite imagery. The 2D imagery is preprocessed to generate a point cloud of the area of interest. The point cloud is optimized by removing atmospheric clouds and shadows. A 3D geographical information system (GIS) map with multiple levels of details (LOD) is generated.

15 Claims, 23 Drawing Sheets

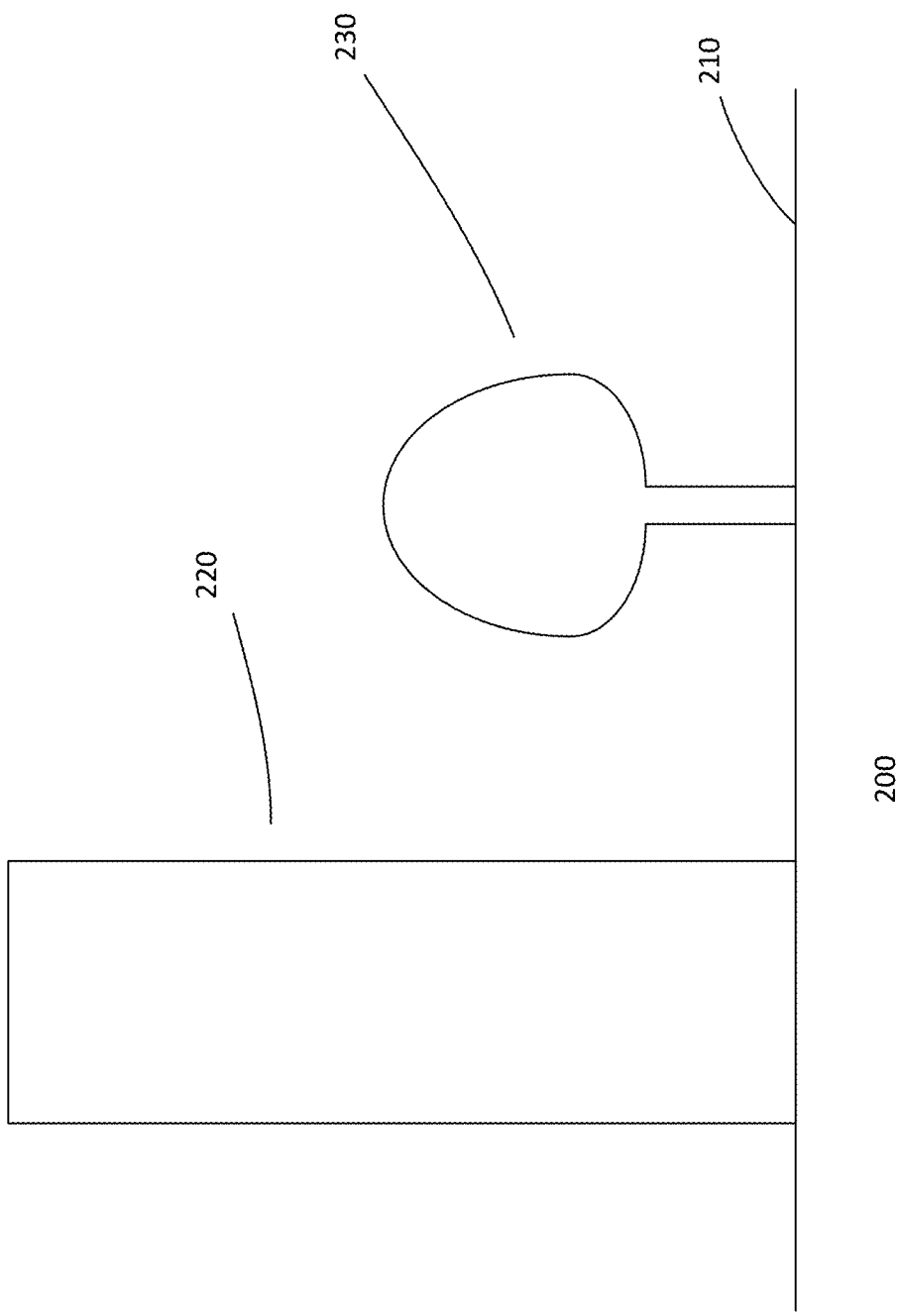

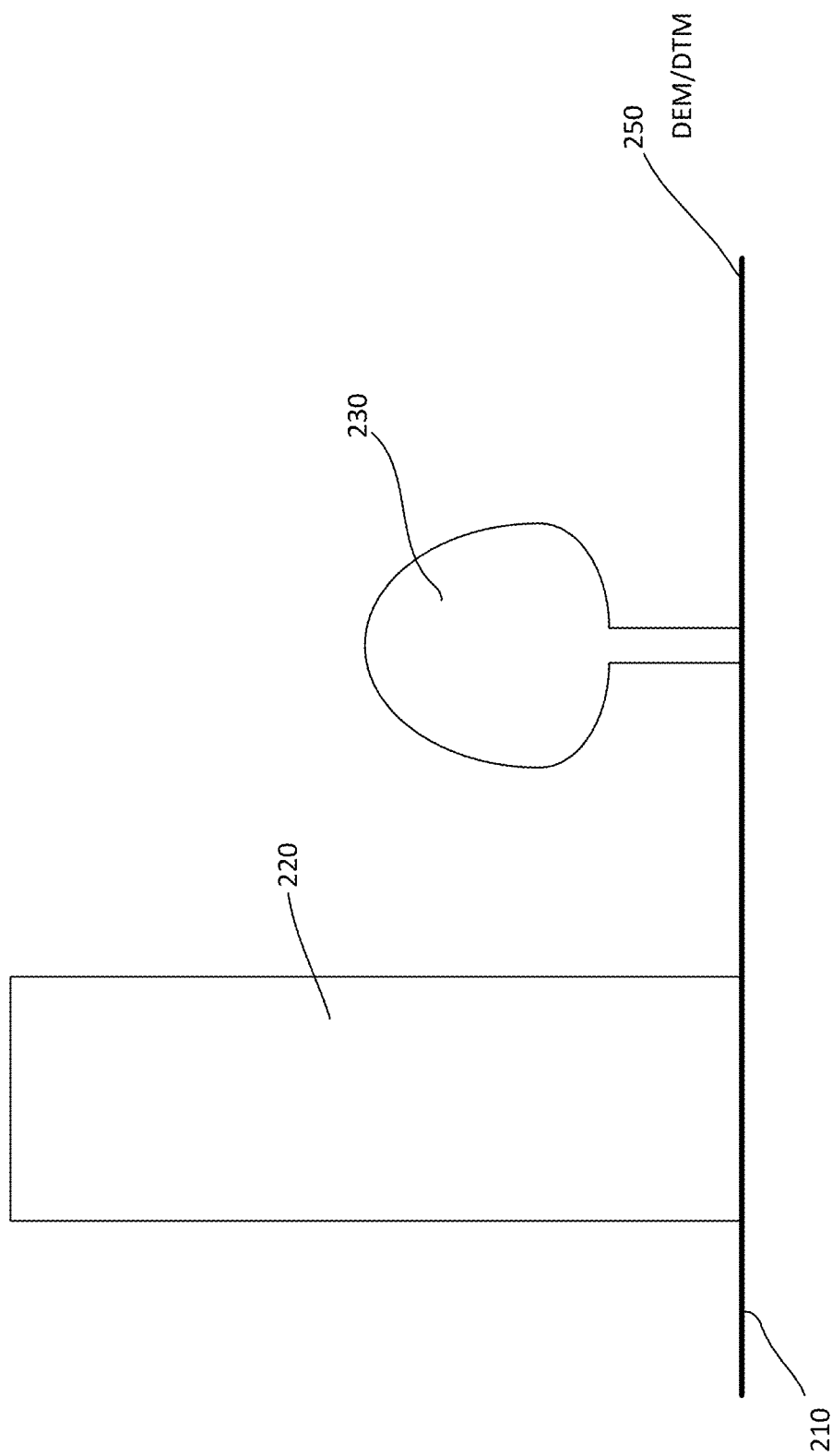

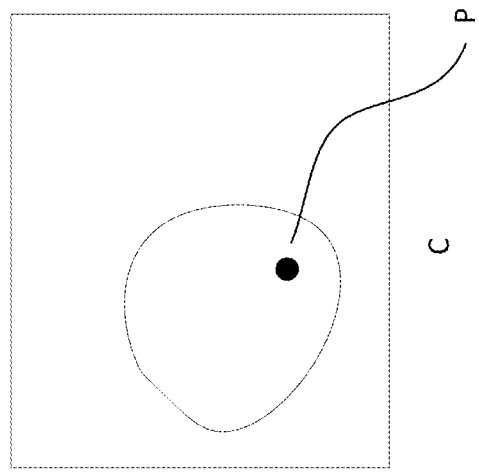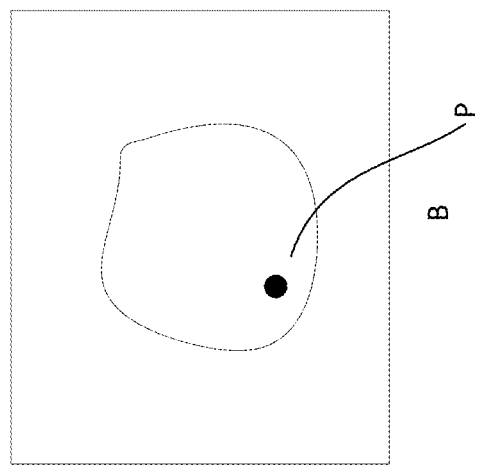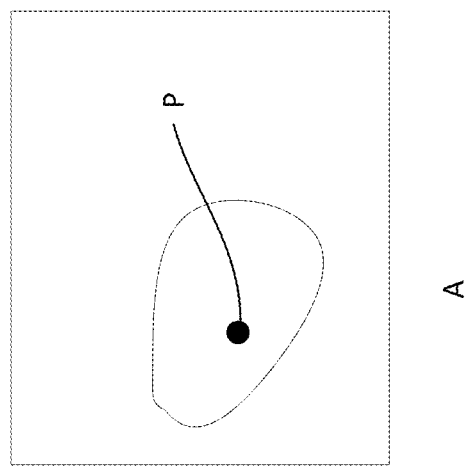
Fig. 3b

600

Backward image
Nadir image
Forward image
Fig. 12

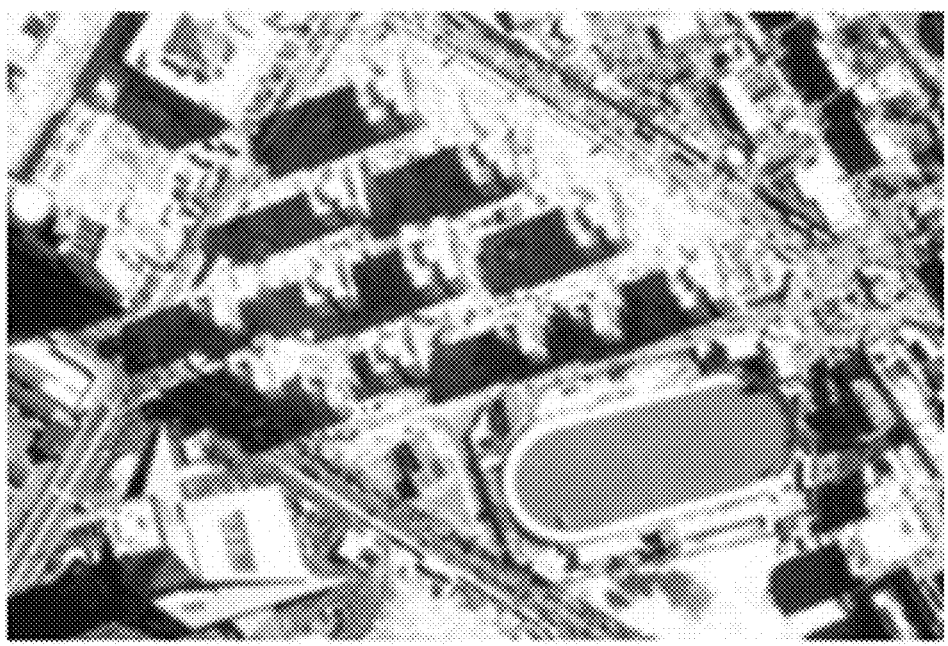
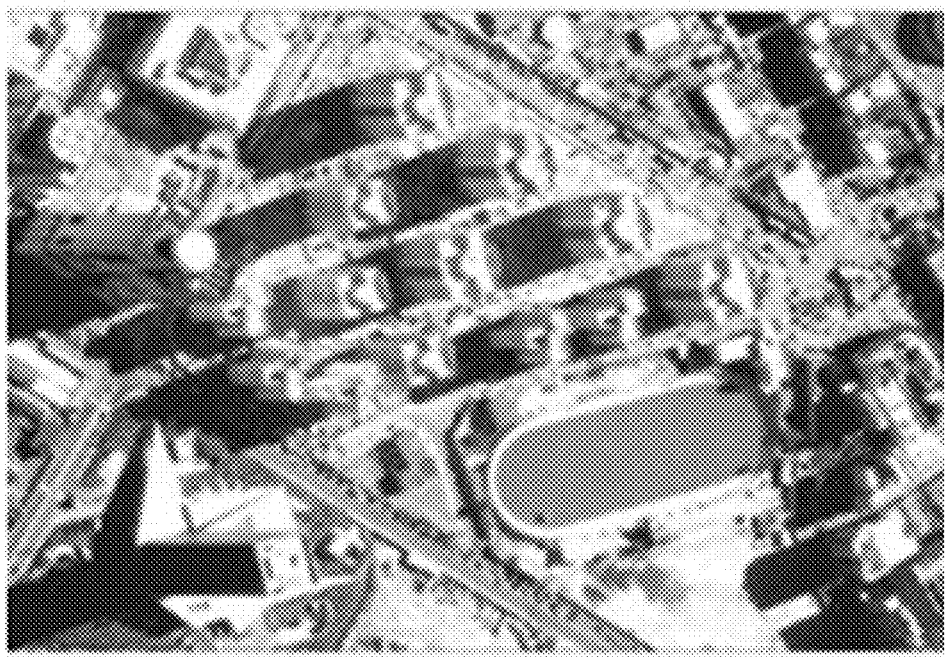
Fig. 13

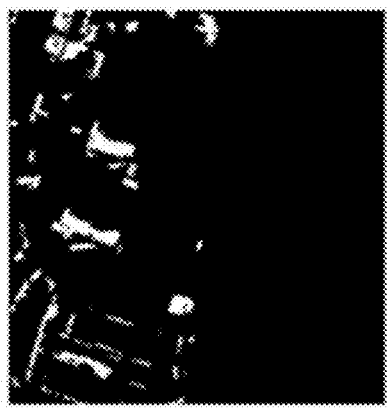
Fig. 15a

1800

GEOSPATIAL MAPPING

CROSS-REFERENCE

The present disclosure is a continuation-in-part of the US patent application filed on Nov. 9, 2021, with application Ser. No. 17/521,874, titled HIGHLY PARALLEL PROCESSING SYSTEM, and also claims the benefit of US Provisional applications with Ser. Nos. 63/137,743, 63/137,745, 63/137,746, 63/137,748, 63/137,749, 63/137,751, and 63/137,752, which were all filed on Jan. 15, 2021. All disclosures are herein incorporated by reference in their entireties for all purposes.

FIELD OF THE INVENTION

The present disclosure relates to 3D geographical mapping using geospatial data.

SUMMARY

The disclosure relates to 3D geospatial mapping of an area of interest from 2D satellite imagery. An embodiment includes a method for 3D geospatial mapping. The method includes analyzing 2D satellite imagery of an area of interest to generate a digital surface model (DSM) and a digital elevation model (DEM). The DSM is a surface profile of the area of interest and the DEM is a bare surface profile of the area of interest without protrusions. The satellite imagery is preprocessed to generate a point cloud of the area of interest. Preprocessing to generate the point cloud includes removing atmospheric clouds, removing shadows, and generating a 3D model of a building in the area of interest. A 3D geographical information system (GIS) map with multiple levels of details (LOD) is generated. A road network is layered onto the bare surface profile of the DEM. Layering includes identifying the road network from the point cloud, identifying people and cars from the point cloud, removing the people and cars from the point cloud, and layering the road network without people and cars onto the bare surface profile. A geometry of the building is computed from the point cloud. The GIS map is textured. The layering of the road network, computing the geometry of the building and texturing are repeated for each LOD.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

FIGS. 2a-2c illustrate a process for obtaining a digital surface model and a digital elevation model of an area of interest;

FIGS. 3a-3b illustrate triangulation of an area of interest using satellite imagery;

FIG. 12 shows forward, nadir and backward satellite images;

FIG. 13 shows stereo images of Tripoli, Lybia captured by a satellite.

FIG. 15a illustrates the process for extracting footprints of buildings;

DETAILED DESCRIPTION

Embodiments described herein generally relate to a 3D geospatial mapping using satellite data. For example, 3D geospatial mapping involves analyzing satellite imagery from low orbiting satellites.

Figure 1:
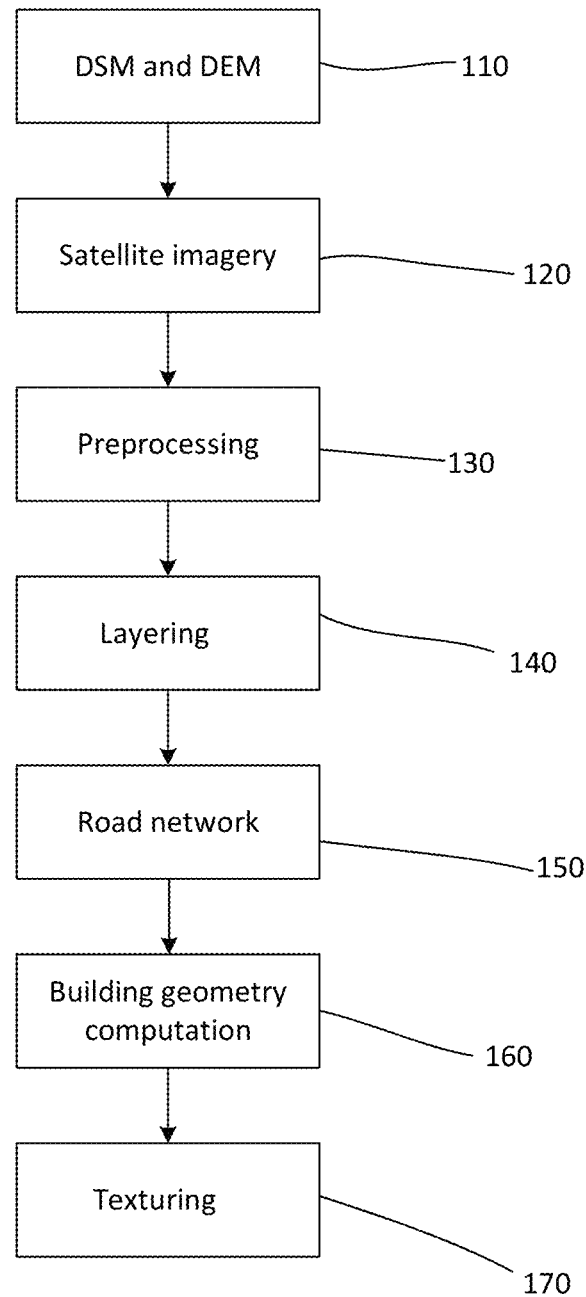
FIG. 1 shows an exemplary geospatial mapping process.

FIG. 1 shows a simplified diagram 100 of geospatial mapping. At 110, images are analyzed to compute the digital surface model (DSM) and digital elevation model (DEM) to create the surface of the mapping area of interest. The DEM, for example, is the bare surface of the area of interest, excluding structures, trees, and other objects protruding from the ground.

Figure 2B:
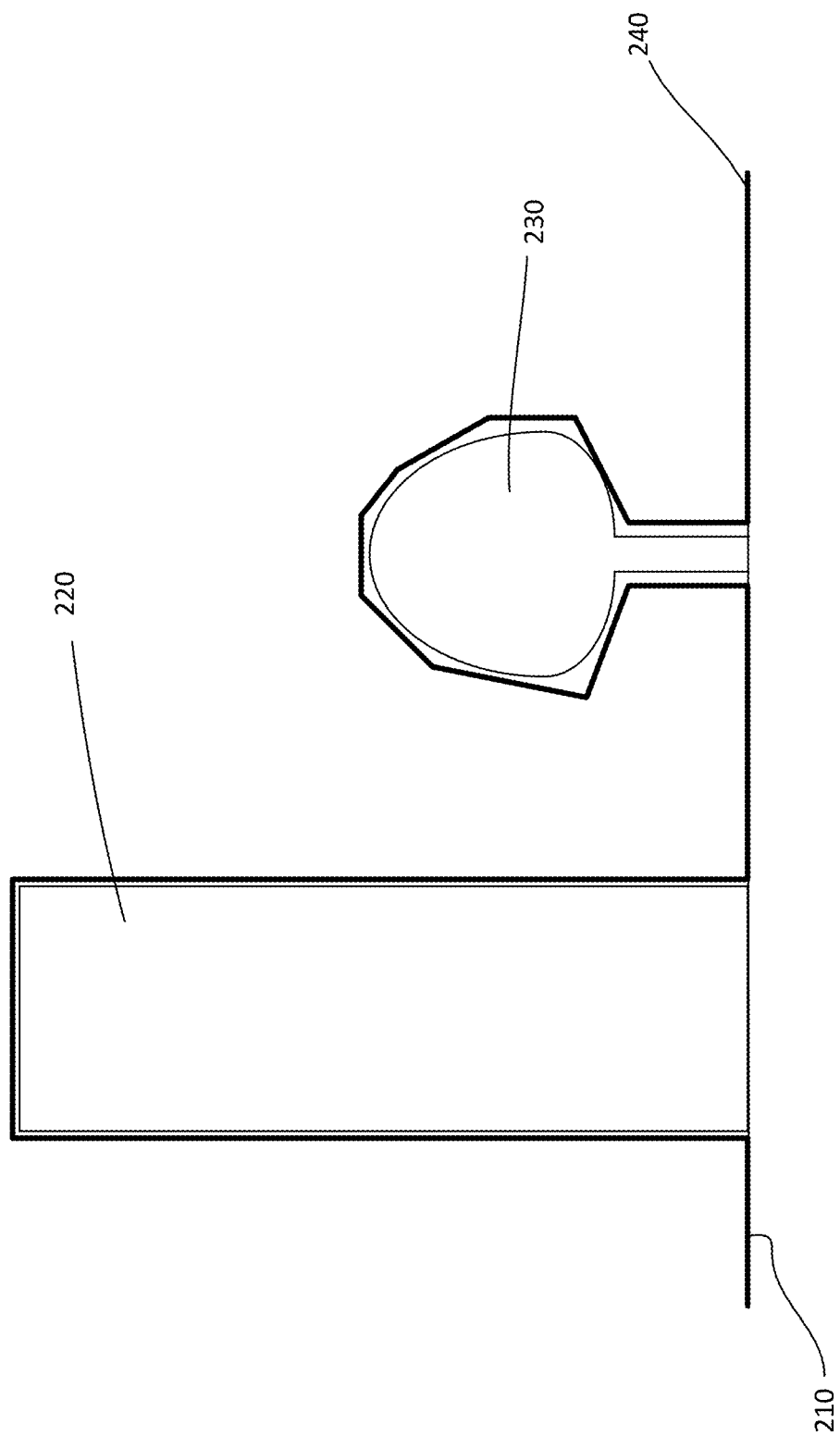

FIGS. 2a-c illustrates a DSM and DEM of a simplified area of interest. Referring to FIG. 2a, the simplified area of interest 200 is shown. As shown, the area of interest includes a ground surface 210. Protruding from the ground surface is a building 220 and a tree 230. Of course, the area of interest may include other objects protruding from the ground surface.

In FIG. 2b, images of the area of interest are analyzed to compute the DSM of the area of interest 200. The DSM produces a DSM profile 240 which outlines the ground surface 210, the building 220, and the tree 230. For example, the DSM profile outlines the surface of the area, including objects protruding from the ground surface.

As shown, in FIG. 2c, DEM is computed from the imagery of the area of interest 200. The DEM produces a DEM or DTM profile 250 of the ground surface. The DEM profile outlines the ground surface and excludes any objects protruding from the ground surface.

Referring back to FIG. 1, after the DEM profile is obtained, satellite imagery is employed to continue geospatial mapping of the area of interest at 120. For example, satellite imagery from low orbiting satellites is used. Numerous images of the area of interest from satellites are analyzed. Using triangulation techniques, any point on the images in an area of interest can be analyzed.

Figure 3A:
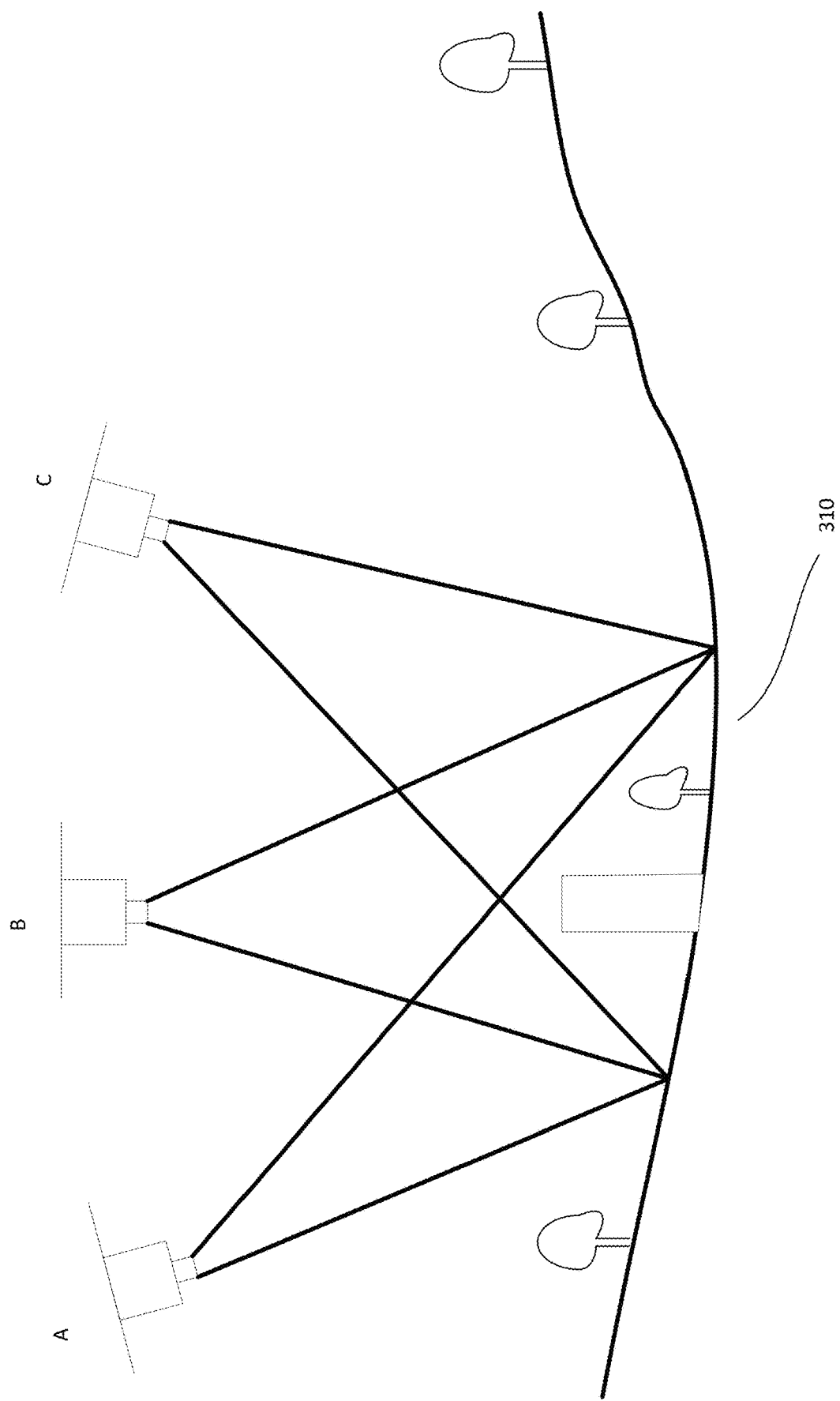

FIG. 3a illustrates capturing images on an area of interest by satellites, such as low orbiting satellites. Images of the area of interest are captured by, for example, satellites. For example, first, second and third satellites A, B, and C orbit the earth and capture images. Although 3 satellites are shown, it is understood that a multiplicity of satellites orbit the earth. As the satellites orbit, the satellites capture images of the earth. For example, satellites capture images of the designated area (area of interest) 310. The geospatial location of any point or pixel in the images can be determined by triangulation. For example, triangulation of the location of any point of the image can be determined using 3 satellites.

In one embodiment, the first satellite captures a first image of the designated area, the second satellite captures a second image of the designated area and the third satellite captures a third image of the designated area. The first image may be referred to as the forward image, the second image may be referred to as the nadir image, and the third image may be referred to as the backward image. The nadir image is an image which is captured directly over the designated area while the forward and backward images are captured at an angle to the designated area. For example, the images have different perspectives of the designated area. Triangulation can be used to determine the exact location of the designated area. For example, exact longitudinal and latitudinal coordinates can be mapped for each pixel of the images. Numerous sets of images may be employed to map a large geographical region. The mapped region can be any sized region, for example, a block, a neighborhood, a city, region of a state or state. Other sized regions, including smaller or larger sized regions may also be mapped.

FIG. 3b shows images A, B, and C from satellites A, B, and C of the area of interest. As shown, the area of interest and point of interest P within the area of interest in the different images are different based on the different perspectives of the different satellites.

Referring back to FIG. 1, the satellite imagery is preprocessed at 130. Preprocessing, in one embodiment, includes atmospheric cloud removal, shadow removal and image or texture optimization. For example, atmospheric clouds and shadows are removed and the images are optimized using the numerous images taken of the area of interest. The images, for example, are taken at different days, different times of the day and at different perspectives. The preprocessing generates a point cloud of the area of interest. The point cloud is a 3D dataset of each point in the area of interest. For example, the point cloud can be used to model a building.

Figure 4:
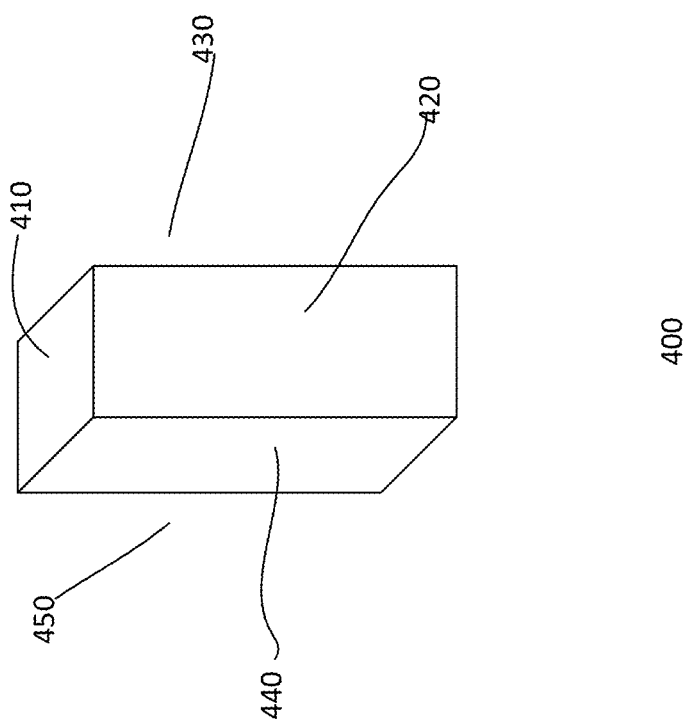
FIG. 4 illustrates a 3D model of a building from a point cloud.

FIG. 4 illustrates the modeling of a 3D building 400. As shown, the building includes 5 surfaces. The surfaces include the top surface 410 or roof of the building while the other 4 surfaces 420, 430, 440, and 450 correspond to the four side surfaces of the building. Any point on the building can be determined. The point cloud can be used to determine the geometry, shape and volume of the building. Texture optimization of the building can be performed using the point cloud.

Referring back to FIG. 1, based on the point cloud generated at 130, the bare surface of the area of interest from the DEM is layered at 140. Layering, for example, generates a 3D geographical information system (GIS) dimensional map. The GIS dimensional map has different levels of details (LOD). A LOD, for example, is rendering the map at different resolutions. In one embodiment, the GIS map may have 3 different LODs, such as 514, 2 k, and 4 k. Other numbers of LODs, as well as other resolutions for the LODs, may also be useful.

At 150, a road network is layered onto the bare surface of the area of interest. The layering of the road network includes removing vehicles and people. Vehicles and people can be removed by identifying them in the point cloud. The road network without the vehicles and people is layered onto the GIS map.

At 160, building geometry is computed. For example, the height, shape, and volume of the buildings are computed. The layered GIS map is textured at 170. For example, buildings are textured. Texturing, for example, is based on image or texture optimization from preprocessing at 130. Road network 150, building geometry computation 160, and texturing 170 are repeated for each LOD. After each LOD is computed, geospatial mapping is completed.

Figure 5A:
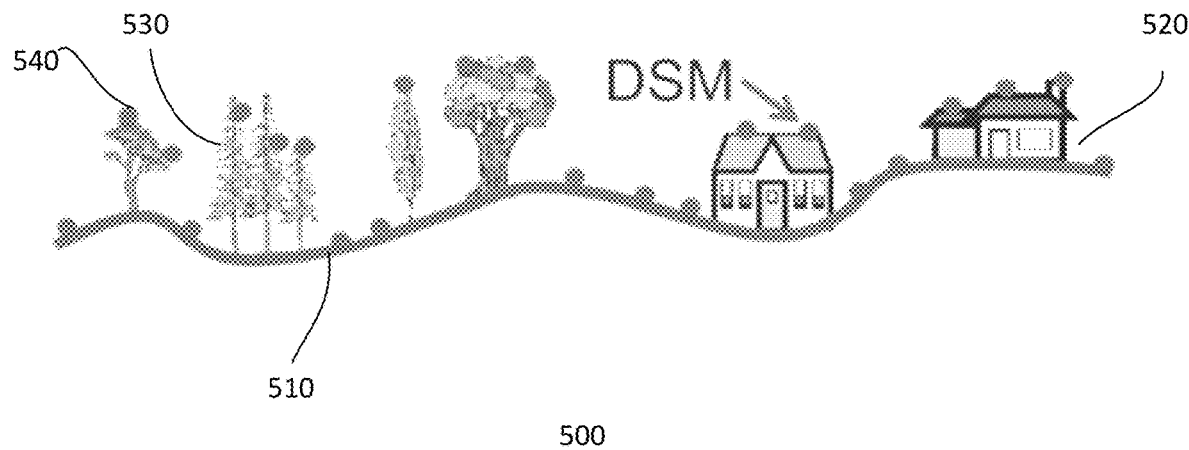
FIGS. 5a-5b exemplary illustrate a digital surface model and a digital elevation model of another area of interest.
Figure 5B:
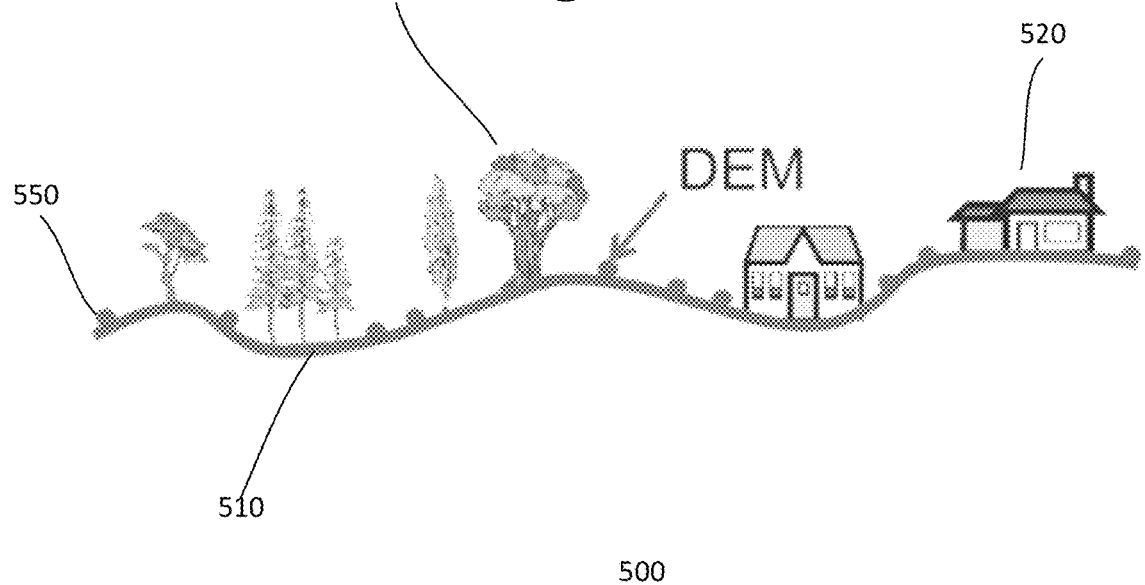

FIGS. 5*a*-*b* illustrates a DSM and DEM of another simplified area of interest 500. The simplified area of interest includes a ground surface 510. Protruding from the ground surface are houses 520 and trees 530. Of course, the area of interest may include other objects protruding from the ground surface.

In FIG. 5*a*, a DSM of the area of interest is computed from 2D imagery. The DSM produces a DSM profile which outlines the ground surface 510, the houses 520, and the trees 530, as indicated by points 540. For example, the points of the DSM profile outline the surface of the area of interest, including objects protruding from the ground surface.

As shown, in FIG. 5*b*, a DEM is computed from the imagery of the area of interest. The DEM produces a DEM or DTM profile of the ground surface, as indicated by points 550. The DEM profile outlines the ground surface and excludes any objects protruding from the ground surface, such as houses and trees.

Figure 6:
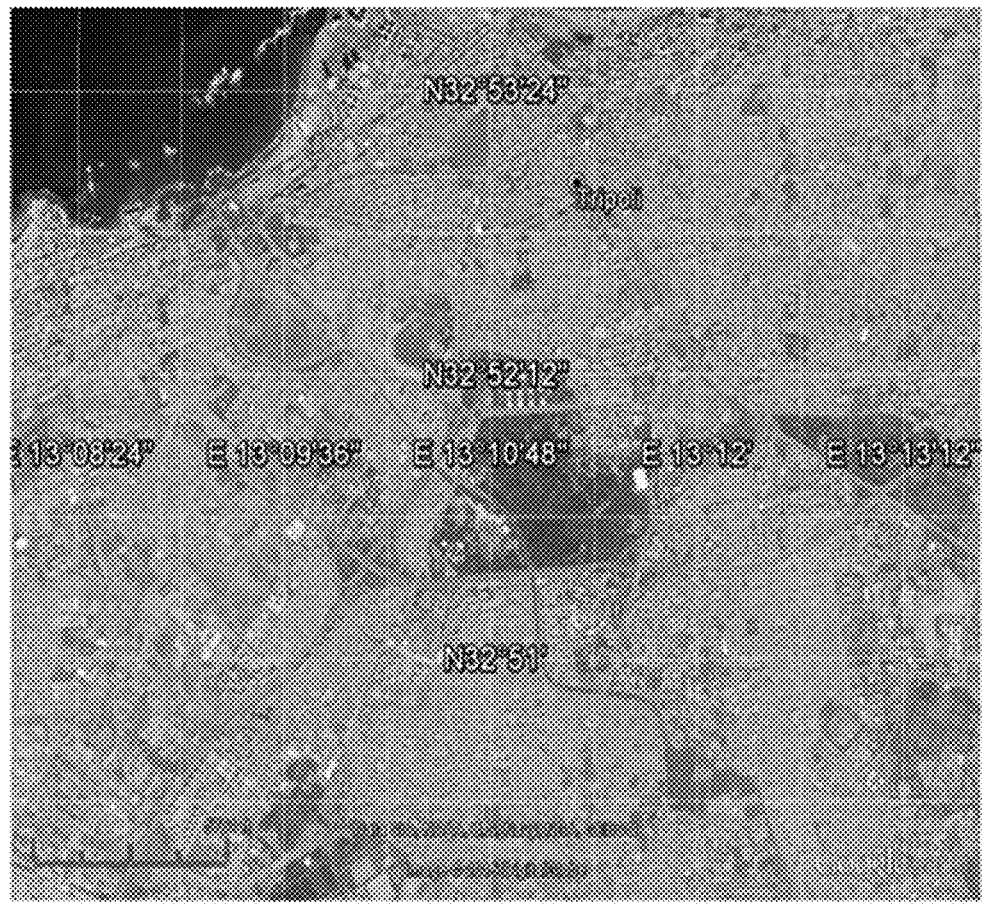
FIG. 6 shows an image of an area containing an area of interest.

FIG. 6 shows an image 600 of a region containing an area of interest. The area of interest is located in the region of Tripoli, Libya between the latitude of 32° 50' 10" and 32° 53' 54" north and the longitude of 13° 08 04" and 13° 13' 32" east.

Figure 7:
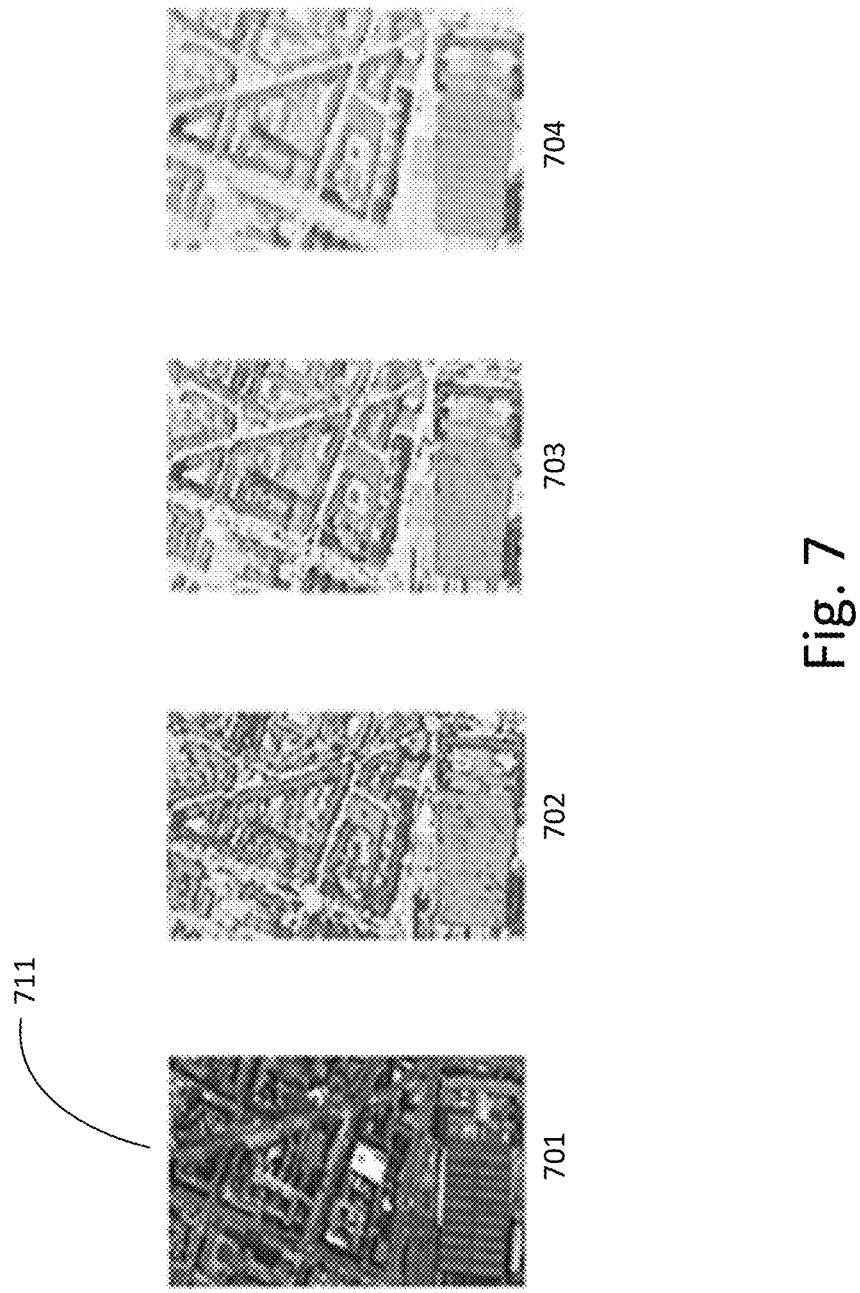
FIG. 7 illustrates an image of an area of interest and various DSMs therefrom.

FIG. 7 illustrates an image of an area of interest and various DSMs therefrom. As shown, a multispectral image 701 contains the area of interest 711. DSMs 702 and 703 are extracted from different stereo angles while DSM 704 is extracted from triplet images from the same satellite.

The results show that DSMs can be generated from stereo pairs, but the quality of the DSM (buildings model outline) was not good in the urban areas. For example, high buildings produce large shadow areas due to the sunlight incidence angle. Stereo matching is difficult in these areas, which was revealed by large height differences (more than 1 meter) between the satellite DSM and the LiDAR-DSM. Due to the large convergence angles of the satellite images that compose the stereo pair, occlusions occur. Stereo matching is also not possible in these areas, resulting in a lower quality DSM. Although some of the differences found between the satellite DSM and the reference DSM may be explained by the time difference of the two data sets (new constructions, growth of trees and moving objects such as cars), it was concluded that GeoEye-1 and WorldView-2 stereo pair image combinations are not well adapted for high accuracy DSM extractions in urban areas. Postprocessing is subsequently performed, such as texturing, super-scaling, point editing and filtering, to optimize the extracted DSM.

Figure 8:
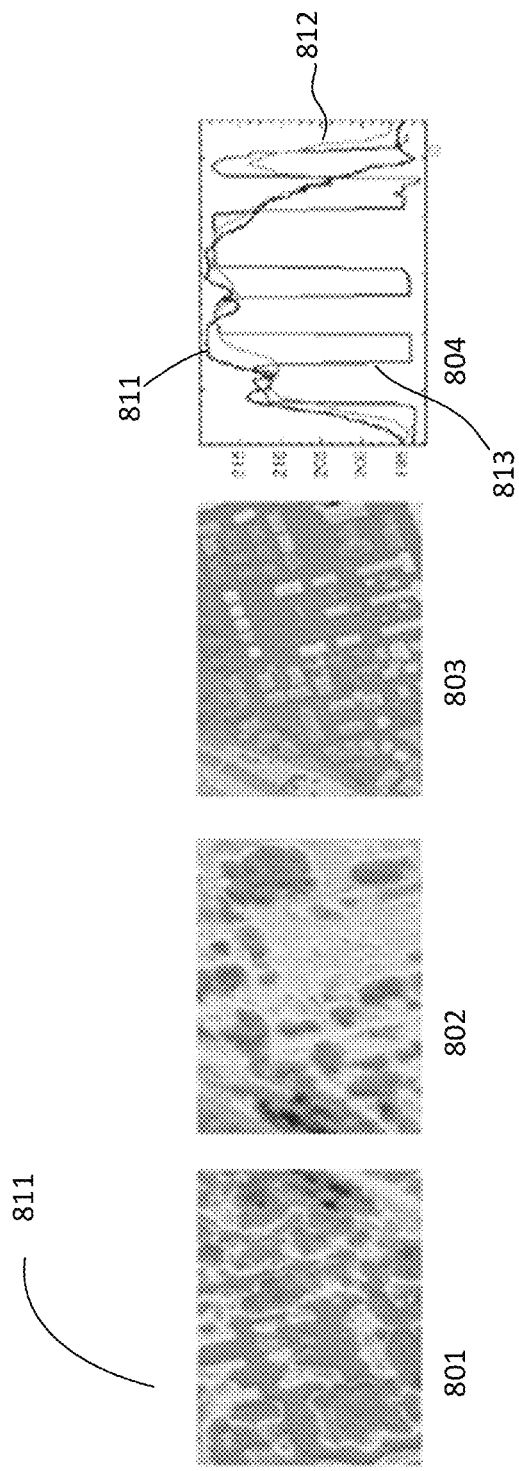
FIG. 8 shows various DSM models extracted from different types of imagery.

FIG. 8 shows various DSM models extracted from different types of imagery. As shown, DSM 801 is extracted from GeoEye-1 satellite imagery, DSM 802 is extracted from World View-2 satellite imagery and DSM 803 is extracted from Lidar imagery. The profiles are mapped in graph 804. The profiles show the difference between the reference and the extracted models (profile 813=LiDAR DSM, profile 811=GeoEye-1 DSM and profile 812=World-View-2-DSM).

Figure 9:
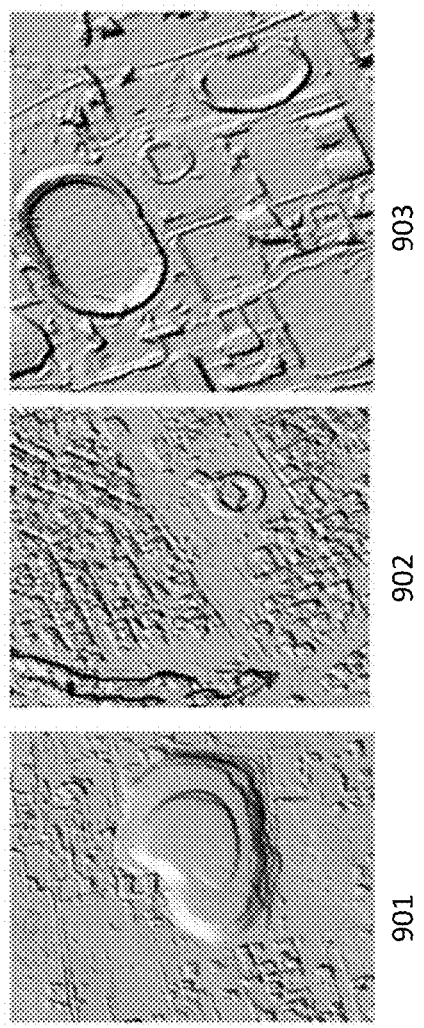
FIG. 9 shows various 3D DSM models of different areas of interest.

FIG. 9 shows various 3D DSM models of different areas of interest. The DSM models are DSM shaded relief models of different features in urban and suburban areas. DSM 901 shows DSM of a small artificial hill, DSM 902 represents different buildings in an urban area and DSM 903 shows different structures of Olympic city.

Figure 10:
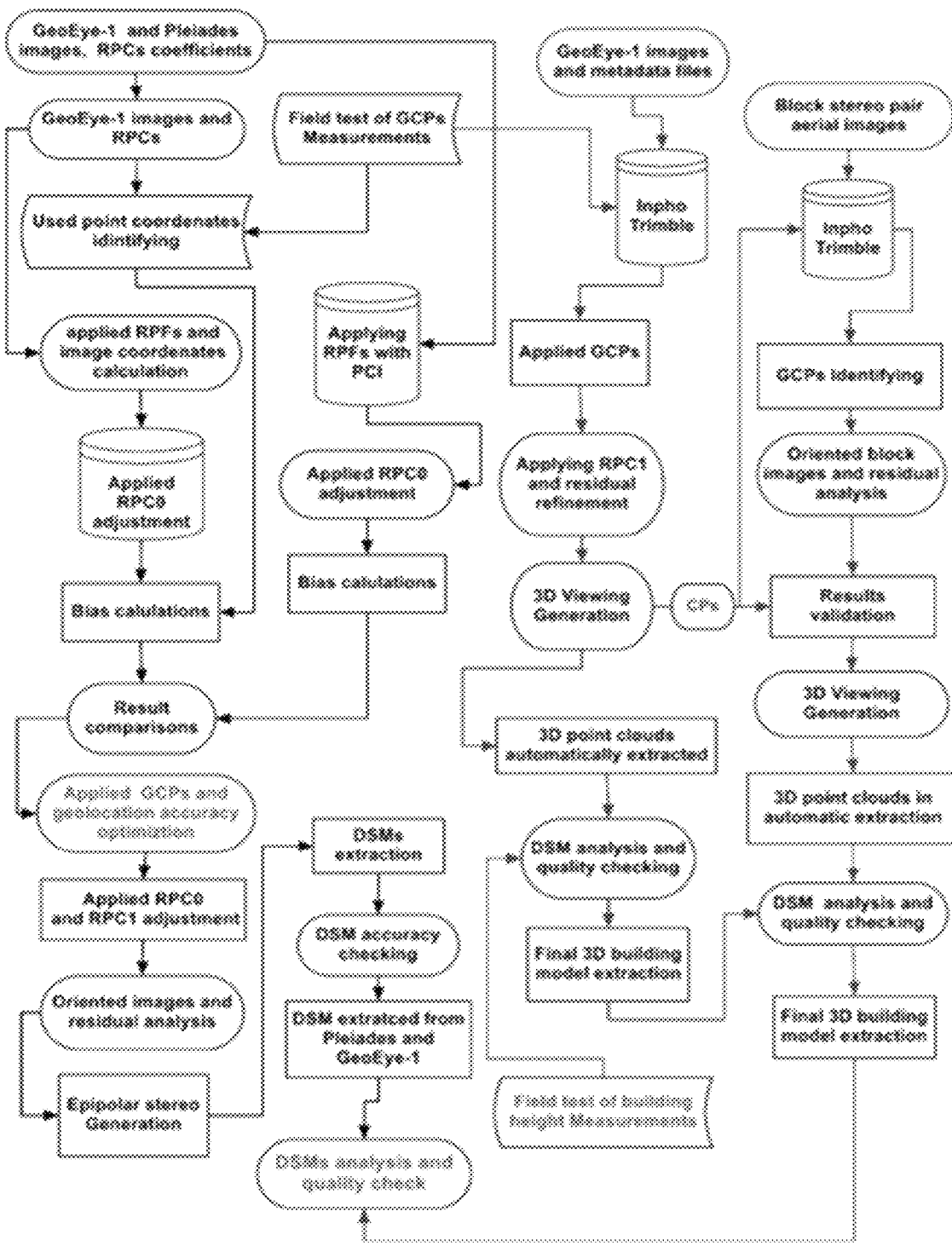
FIG. 10 shows an exemplary embodiment of a process flow for generating a 3D map model from 2D satellite imagery of an area of interest.

FIG. 10 shows an exemplary embodiment of a process flow 1000 for generating a 3D map model from 2D satellite imagery of an area of interest.

Figure 11:
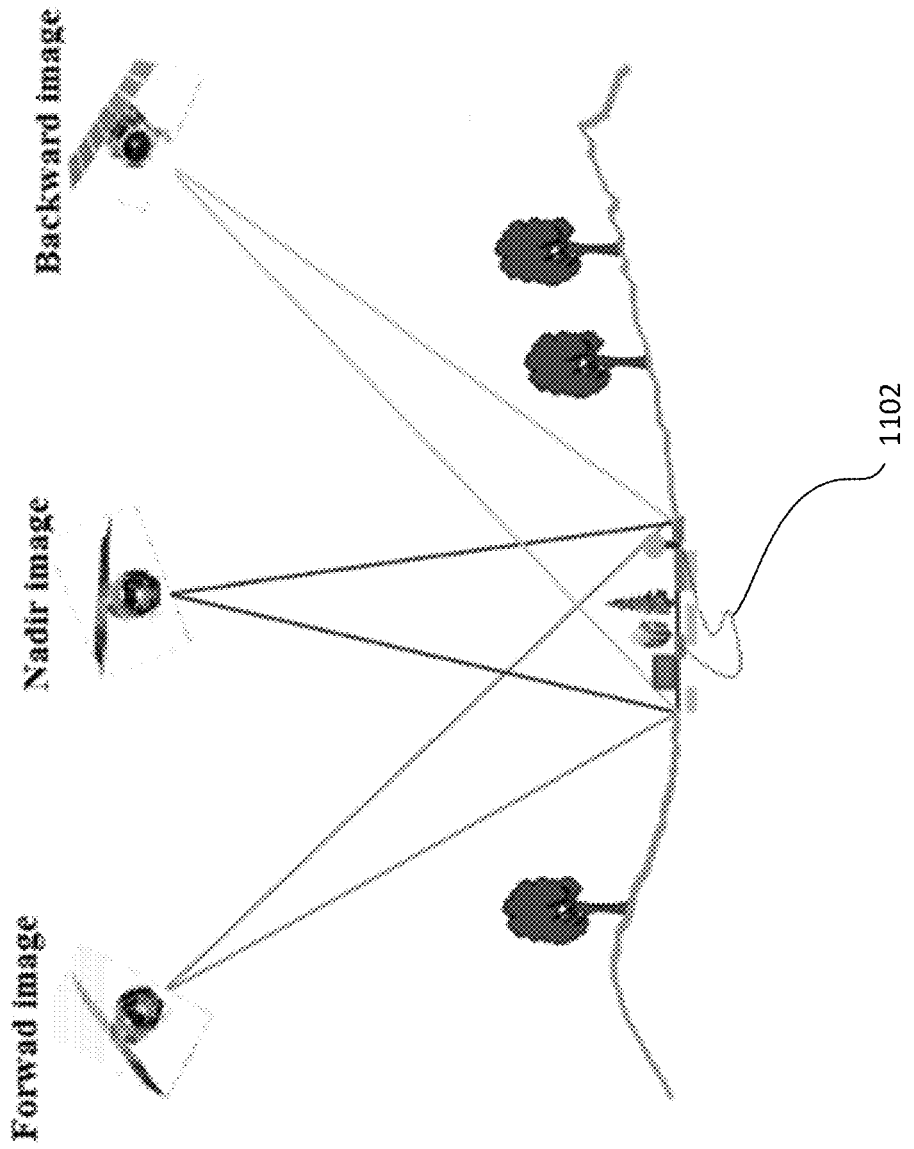
FIG. 11 illustrates an exemplary embodiment of capturing images on an area of interest by satellites.

FIG. 11 illustrates an exemplary embodiment of capturing images of an area of interest or designated area by different satellites. Images of the area of interest 1100 are captured by first, second and third satellites orbiting the earth. The first satellite captures a first image of the designated area, the second satellite captures a second image of the designated area and the third satellite captures a third image of the designated area. The first image may be referred to as the forward image, the second image may be referred to as the nadir image, and the third image may be referred to as the backward image. The forward and backward images include an occluded area 1102. Alternatively, the forward, nadir and backward images may be captured by one satellite as it moves along its orbital track.

FIG. 12 shows forward, nadir and backward images captured by a satellite as it moves along its orbital tack or by different satellites.

FIG. 13 show stereo images 1401 and 1402 of Tripoli, Lybia which were captured by GeoEye-1.

Figure 14:
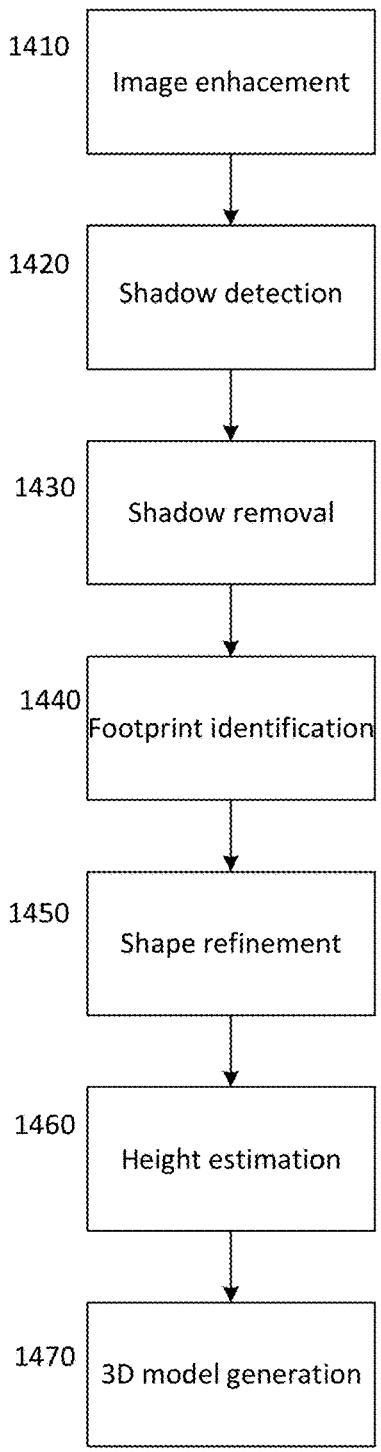
FIG. 14 is an embodiment of a process flow for 3D reconstruction of buildings.

FIG. 14 shows an embodiment of a process 1400 for 3D generation of buildings in the area of interest. At 1410, image enhancement is performed to obtain a clear contrast between the objects in, for example, the urban landscape. At 1420, the process detects shadow regions of the buildings. Their locations were distinguished from other non-building shadows and dark objects within the image space. At 1430, the shadows of the buildings are effectively extracted after applying post-processing techniques to obtain a binary image that solely included the buildings' shadows. At 1440, the process detects building footprints based on shadow information. The building footprints are extracted by, for example, applying a graph theory framework based on graph partitioning. At 1450, the geometric shapes of the extracted buildings are refined by improving the edges of the footprints of the buildings. At 1460, the heights of the buildings are estimated. The estimation, in one embodiment, is facilitated by solar information in the metadata file attached to the image data. The estimation of the heights of the buildings is important to the creation of the 3D building models. After obtaining the footprints and heights of the buildings, 3D models of the existing buildings in the area of interest are created at 1470. The process also includes a validation stage and a sensitivity analysis of the generated models.

Table 1 below provides details of the various stages of the process of FIG. 14:

TABLE 1

| Task | The subroutine process | formulae & parameters |
| --- | --- | --- |
| Image enhancement | Normalise image bands values<br>Adjust image intensity values | ImgR = (imgR-min.img)/(max.img-min.img), (R = red image band)<br>Contrast stretching threshold |
| Shadow detection | Normalise all images bands<br>Divide between RGB and NIR<br>Apply the non-linar mapping function to RGB and NIR, then Multiply their outcomes<br>Multiply the results from division and multiplication operations<br>Thresholding and Refining<br>Subtract vegetation cover | The slope of the sigmoid function $\alpha$, the inflection point $\beta$ and $\gamma$ to stretch the histogram in the dark parts before applying the sigmoid function |
| Post-processing of the shadow regions | Region growing function<br>Create morphological structuring element<br>Apply morphological opening<br>Apply Fuzzy landscape | Intensity ($T_I$), ratio ($T_R$), search region ($T_{low}$-$T_{high}$), and vegetation ratio ($T_{veg}$) thresholds. |
| Building footprint identification | Apply Gaussian Mixture Models (GMM)<br>Define ROI and bounding box<br>Apply GrabCut Algorithm<br>Select only the buildings, inside the ROI, adjacent to the shadow region<br>Create the building mask (binary image) | Shrinking distance (d), ROI size, smoothing constant ($\gamma 1$), area threshold of the selected bounding box |
| Shape refinement, and solar rooftop analysis | Apply Active Contour Algorithm<br>Apply shape fitting functions<br>Extract the refined building mask<br>Calculate roof area and orientation | Number of iterations, area and shape fitting thresholds |
| Building hight estimation | Generate artificial shadows<br>Simulate actual shadow regions<br>Compute Jaccard index<br>Extract the optimal estimated height value | Minimum height ($h_{max}$), minimum height ($h_{min}$), height intercal, Jaccard index, area (p) thresholds |
| 3D Models of Building and validation | Creat a 3D volumetric image<br>Perform image convolution by a Gaussian filter<br>Apply Marching Cubes algorithm<br>Create 3D models in level of details | Gaussian low pass filter of size, Sigma ($\sigma$) and isovalue parameters |

TABLE 1-continued

| Task | The subroutine process | formulae & parameters |
|---|---|---|
| | and overlay their real location on a given image | |

FIG. 15a illustrates the process for extracting footprints of buildings.

Figure 15B:
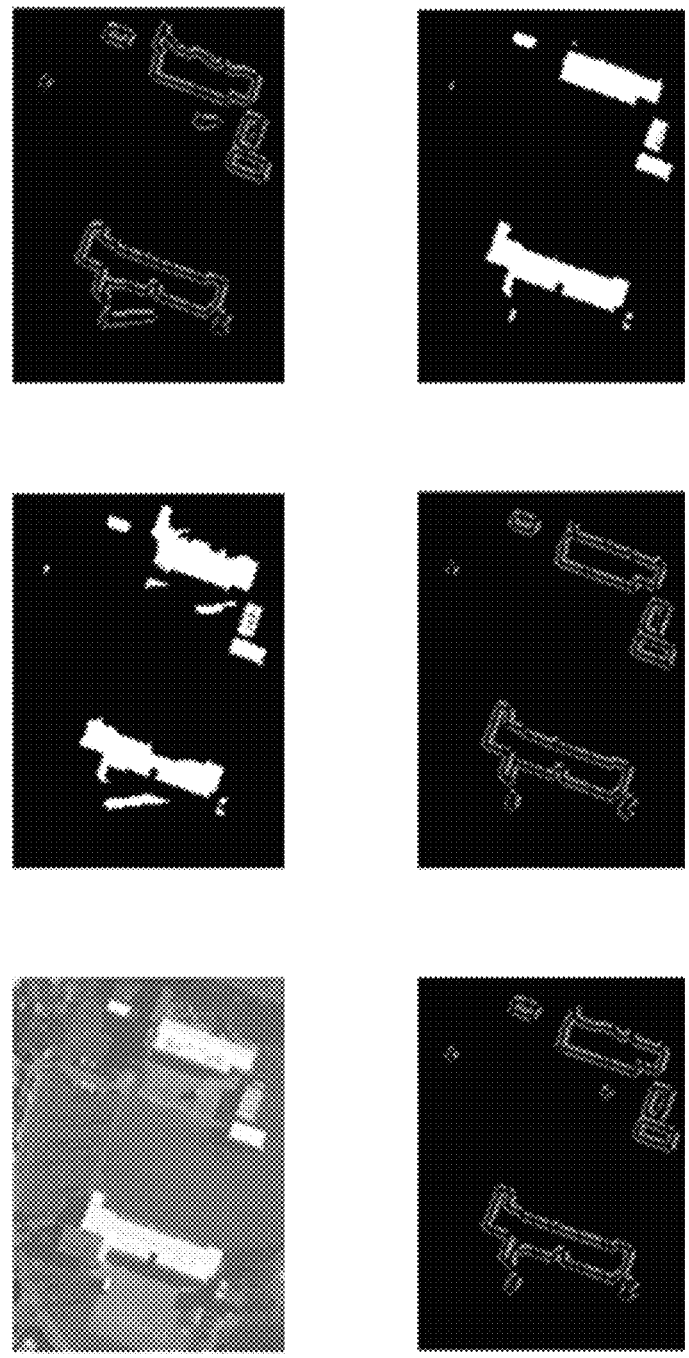
FIG. 15b illustrates the process for edge adjustment and refinement of the footprints of the buildings.

FIG. 15b illustrates the process for edge adjustment and refinement of the footprints of the buildings.

Figure 15C:
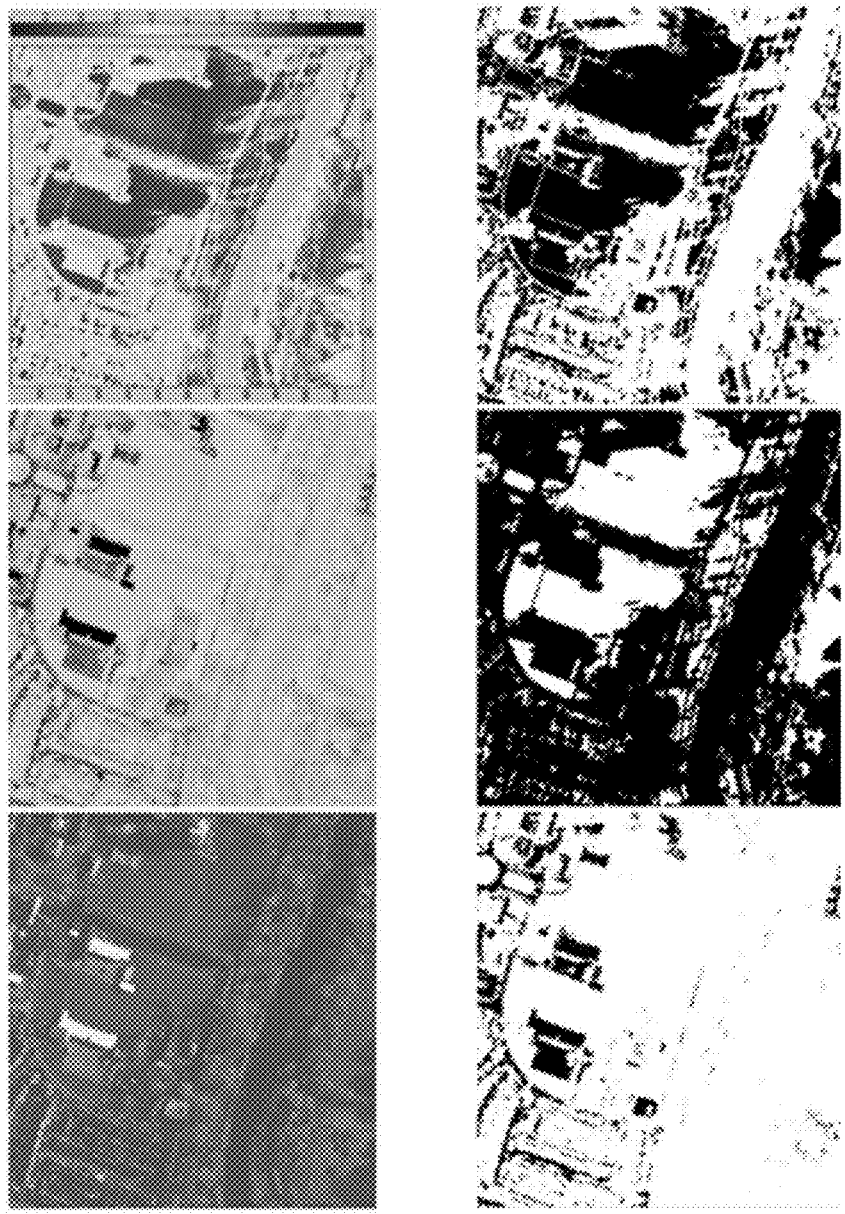
FIG. 15c illustrates the process for shadow detection and extraction.

FIG. 15c illustrates the process for shadow detection and extraction.

Figure 16:
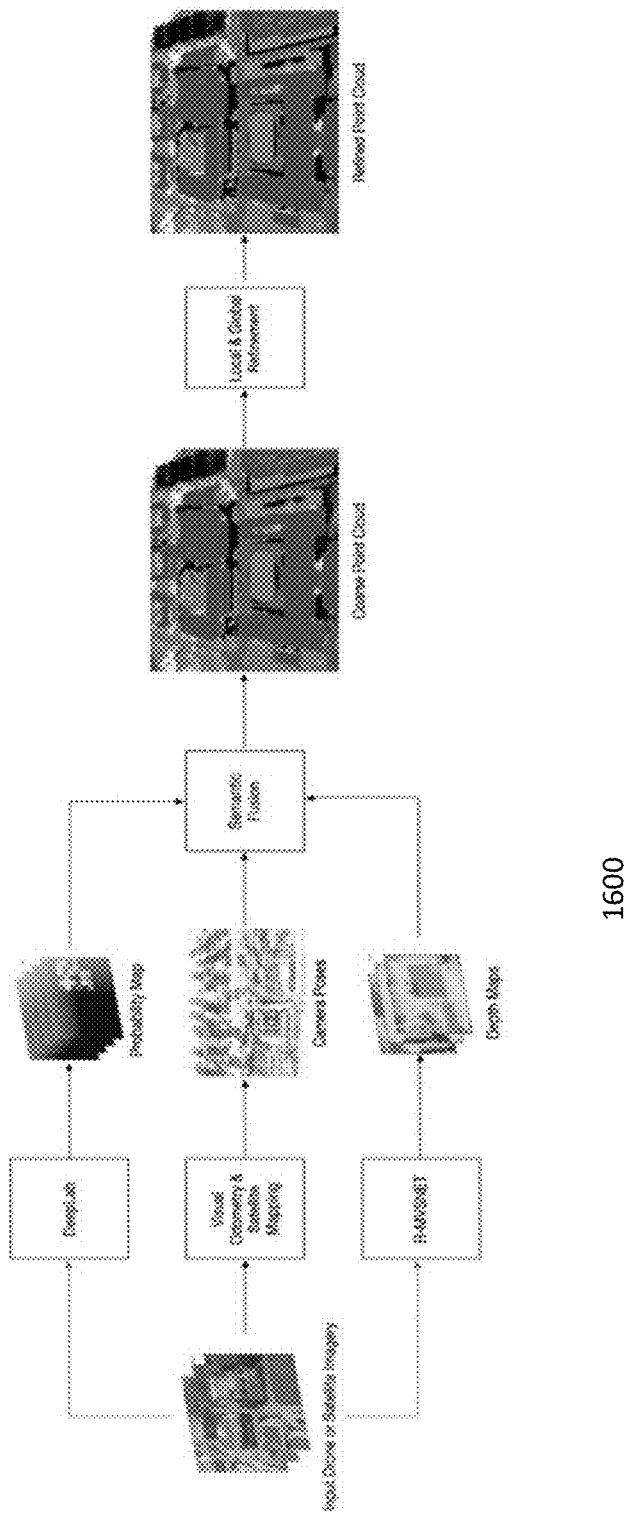
FIG. 16 illustrates an embodiment of a process flow for generating a DSM from 2D imagery.

FIG. 16 illustrates an embodiment of a process flow 1600 for generating a DSM from 2D imagery.

Figure 17:
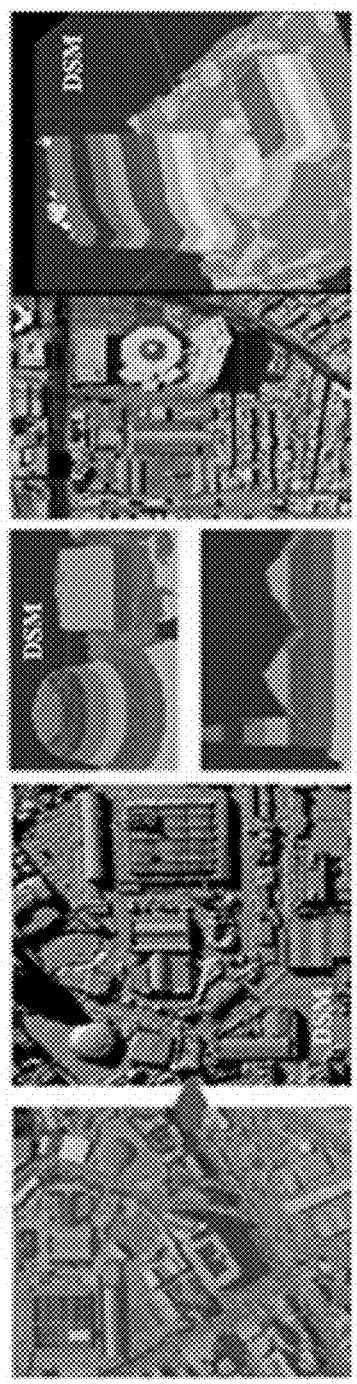
FIG. 17 shows extracted DSMs for different areas within an area of interest.

FIG. 17 shows extracted DSMs for different areas within an area of interest.

Figure 18:
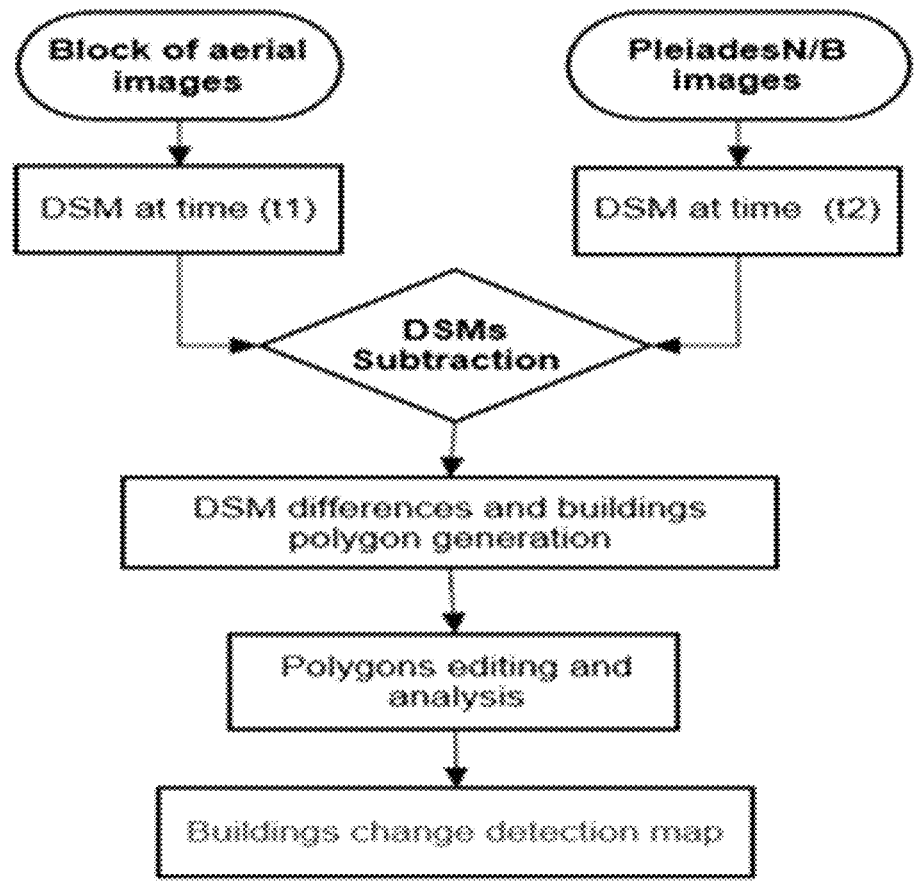
FIG. 18 shows an embodiment of a process flow for change detection from images taken at different times.

FIG. 18 shows an embodiment of a process flow 1800 for change detection from images taken at different times.

Although described in the geospatial mapping of an area of interest, it is understood that geospatial mapping of a region with numerous areas of interest may be involved. The geospatial mapping of a region of interest is similar to an area of interest except that it is repeated for each area of interest within the region of interest. Satellite imagery may be analyzed for the areas of interest. Overlapping images, for example, from adjacent areas of interest, may augment the analysis for mapping the region of interest.

The inventive concept of the present disclosure may be embodied in other specific forms without departing from the spirit or essential characteristics thereof. The foregoing embodiments, therefore, are to be considered in all respects illustrative rather than limiting the invention described herein.

The invention claimed is:

1. A method for 3D geospatial mapping comprising:
   providing 2D satellite imagery related to an area of interest for geospatial mapping;
   analyzing the satellite imagery to generate a digital surface model (DSM) and a digital elevation model (DEM), wherein the DSM is a surface profile of the area of interest and the DEM is a bare surface profile of the area of interest without protrusions;
   preprocessing the satellite imagery to generate a point cloud of the area of interest, wherein preprocessing comprises
      removing atmospheric clouds,
      removing shadows, and
      generating 3D models of buildings in the area of interest;
   generating a 3D geographical information system (GIS) map with multiple levels of details (LOD);
   layering a road network onto the bare surface profile of the DEM, wherein layering comprises
      identifying the road network from the point cloud,
      identifying people and cars from the point cloud,
      removing the people and cars from the point cloud, and
      layering the road network without the people and cars onto the bare surface profile;
   computing a geometry of the buildings from the point cloud; and
   texturing the GIS map, wherein layering the road network, computing the geometry of the building and texturing are repeated for each LOD.

2. The method of claim 1 wherein providing 2D satellite imagery comprises providing stereo pairs of satellite images of the area of interest.

3. The method of claim 1 wherein providing 2D satellite imagery comprises providing triplet satellite imagery of the area of interest.

4. The method of claim 1 wherein the area of interest comprises an urban area with the buildings.

5. The method of claim 1 wherein the DSM comprises a point cloud defining a surface profile of the area of interest with protrusions.

6. The method of claim 5 wherein the DEM comprises a point cloud defining a ground surface profile of the area of interest without protrusions.

7. The method of claim 1 wherein generating the 3D models of the buildings in the area of interest comprises:
   enhancing the 2D satellite imagery to produce enhanced satellite imagery;
   detecting shadows in the enhanced satellite imagery to identify shadow regions;
   post processing the enhanced satellite imagery based on the shadow regions;
   identifying footprints of the buildings based on information of the shadow regions;
   refining shapes of the buildings;
   estimating heights of the buildings; and
   generating the 3D models of the buildings to produce generated 3D building models of the buildings.

8. The method of claim 7 wherein enhancing the 2D satellite imagery comprises:
   normalizing image band values; and
   adjusting image intensity values to enhance contrast of objects in the 2D satellite imagery.

9. The method of claim 7 wherein detecting the shadows comprises:
   detecting shadow regions of the buildings;
   normalizing image bands on the enhanced satellite imagery;
   divide between RGB and NIR; and
   applying a non-linear mapping function to RGB and NIR and multiplying results of the non-linear mapping function.

10. The method of claim 7 wherein post processing comprises effectively extracting shadows of the buildings to generate a binary image of the shadows of the buildings.

11. The method of claim 7 wherein identifying footprints of the buildings comprises applying a graph theory framework based on graph partitioning on the shadow regions.

12. The method of claim 7 wherein refining shapes of the buildings comprises improving edges of the footprints of the buildings.

13. The method of claim 7 wherein estimating the heights of the buildings comprises employing solar information in metadata files of the satellite imagery.

14. The method of claim 7 wherein estimating the heights of the buildings comprises:
   generating artificial shadows;
   simulating actual shadow regions;
   computing jaccard index; and extracting optimal estimated height values of the buildings.

15. The method of claim 7 wherein generating 3D models of the buildings comprises:
creating 3D volumetric images of the buildings;
performing image convolution on the volumetric images with a gaussian filter to generate filtered volumetric images; and
applying marching cubes techniques on the filtered volumetric images.

* * * * *

UNITED STATES PATENT AND TRADEMARK OFFICE
CERTIFICATE OF CORRECTION

| | | |
|---|---|---|
| PATENT NO. | : 11,913,806 B2 | |
| APPLICATION NO. | : 17/577369 | |
| DATED | : February 27, 2024 | |
| INVENTOR(S) | : Lee | |

It is certified that error appears in the above-identified patent and that said Letters Patent is hereby corrected as shown below:

On the Title Page
Item (73) Assignee, Please change "Meridian Innovation Pte Ltd" to --VIZZIO TECHNOLOGIES PTE LTD.--

Signed and Sealed this
Tenth Day of September, 2024

Katherine Kelly Vidal
*Director of the United States Patent and Trademark Office*